June 25, 1963
H. JACOBOWITZ
3,094,824
DEVICE FOR FIXING THE WELDING BASE ON BELT
CONVEYERS OF VACUUM PACKING MACHINES
Filed Sept. 16, 1960
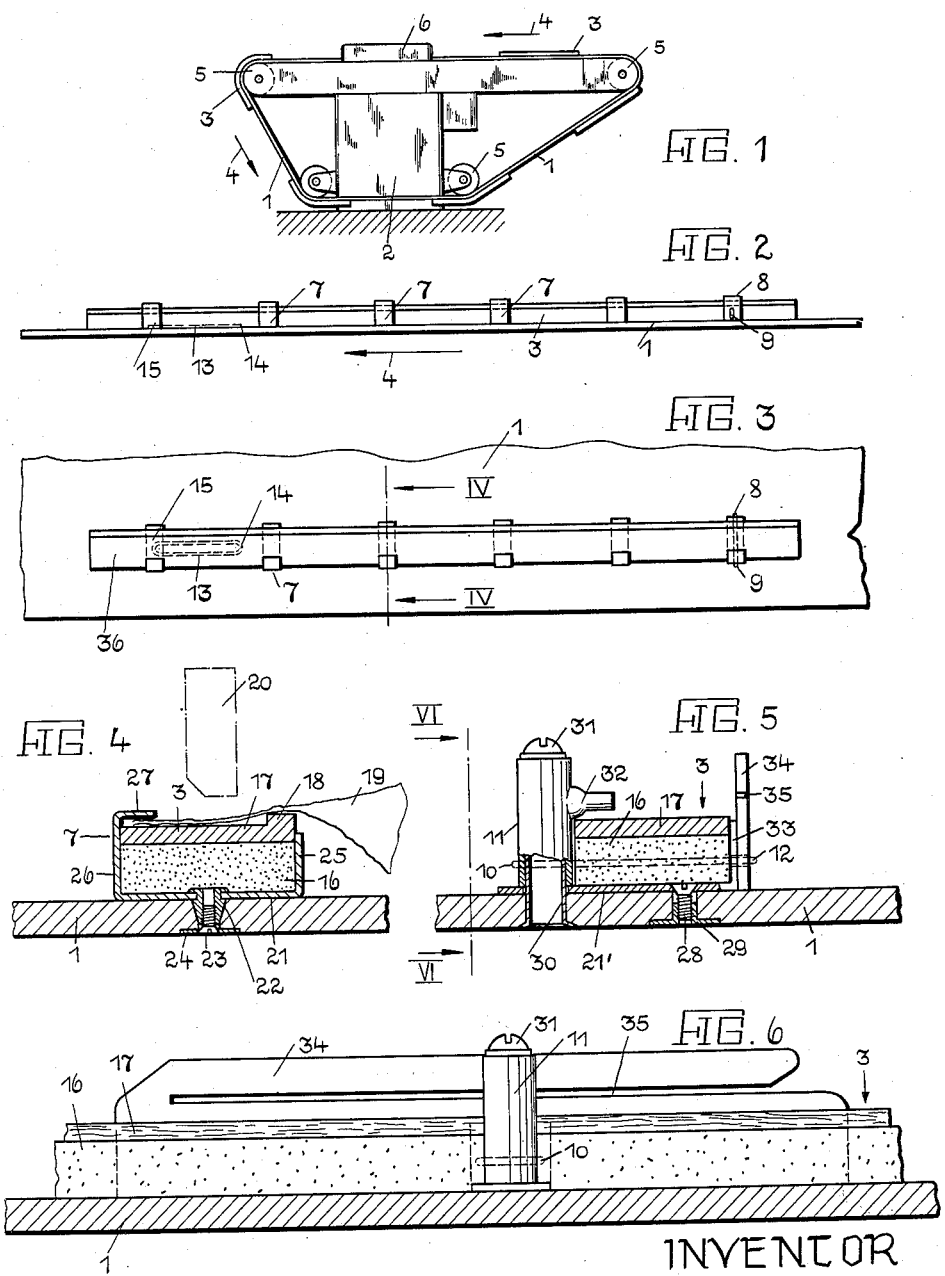
INVENTOR
H. Jacobowitz
BY
ATTORNEYS

3,094,824
DEVICE FOR FIXING THE WELDING BASE ON BELT CONVEYERS OF VACUUM PACKING MACHINES
Herbert Jacobowitz, 16 Sonnenstrasse, Kempten, Allgau, Germany
Filed Sept. 16, 1960, Ser. No. 56,519
Claims priority, application Germany Sept. 26, 1959
10 Claims. (Cl. 53—89)

The present invention relates to a device for fastening the welding base on belt conveyers of vacuum packing machines. Vacuum packing machines serve to evacuate and seal flat bags of compound foil. These machines have a continuous belt conveyer carrying rubber or plastic material strips as a welding base for the welding process for sealing the flat bags. A number of welding bases are fixed on the belt conveyer according to the size of the machine and the size of the vacuum chamber to which the belt conveyer feeds the bags to be closed.

Up to now the welding base was connected with the belt conveyer by gluing or vulcanizing according to the material used for the welding base and the belt conveyer. This manner of fastening is, however, not satisfactory. When the belt conveyer rolls around the return pulleys of the packaging machine, considerable tensile stresses arise in the welding bases arranged on the belt conveyer because of its considerable thickness. The elastic material of the welding base can, it is true, receive these tensile stresses for a certain length of time, but in the continuous operation the adhesion of the strip on the belt is decreased, particularly at the ends of the welding base, and there is danger that cracks could appear in the welding base, which adversely affect the quality of the sealing of the flat bags.

Heat and pressure, furthermore, stress the welding base considerably during the sealing process and thus the base is relatively quickly worn out. The welding base is thus a working part which should be easily interchangeable, but the kind of fastening used up to now does not allow it.

The present invention eliminates the drawbacks of the known fastenings of the welding bases on the belt conveyers. The device according to the invention is characterized by a plurality of holders connected to the belt conveyer, which guide the welding base laterally of the feeding direction, as well as by a releasable fastening means for securing one point of the welding base to an appropriate point on the belt conveyer. Contrary to the known arrangement the welding bases are not glued or vulcanized onto the belt conveyer anymore, but the welding bases are held movable thereon. For interchanging a welding base it is only necessary to release the fastening and thereafter the welding base can be lifted or drawn out from the holders.

In the operation of the belt conveyer no tensile stresses on the welding base on the return rollers can arise, because there is no tight adhering connection between the welding base and the belt conveyer. The fastening and the lateral guides assure, however, that the welding base comes back into the exact position on the belt conveyer after passing the return roller and particularly before entering into the vacuum chamber, which exact position is necessary for a correct sealing operation of the flat bags put on it.

Since by means of the invention the tensile stresses are eliminated arising up to now in known welding bases when they pass over the return rollers, it is possible to adapt the material and the form of the welding base exclusively to the requirements of a specific packaging procedure and it is no longer necessary to make the welding base, particularly low or thin in order to keep the formerly unavoidable tensile stress as small as possible.

In a preferred embodiment of the invention the holder has a U-shaped configuration and the legs of the holder form the lateral guide of the welding base. The U-shaped holder is held on the belt conveyer by means of a screw connection, even if another connection of the holder with the welding base is possible. It is advantageous if the screws for the connection of the holder with the belt conveyer are arranged side by side in order to exclude bending of the holder at the return rollers.

It is useful if at least one leg of the U-shaped holder has a lug, a nose or the like which protrudes over the upper surface of the welding base and which prevents the welding base from lifting-off of the belt conveyer in its return.

The holder can be used for other purposes besides its function for the lateral guide of the welding base. The holder carries particularly a guide rail, which holds the bags to be evacuated and sealed on the welding base. It is also possible to shape one leg of the holder as a feed tube, particularly for feeding a nitrogen filling to be introduced into the bags.

Furthermore the invention provides that the fastening means for securing the welding base is arranged on one of the holders. It is preferable in this connection that the welding base is fixed on the first or last holder of the belt conveyer seen in feeding direction. The fastening can take place by a pin, a bolt, a clamp or the like penetrating through the welding base and guided in the legs of the holder. The other unfastened extremity of the welding base is connected with the belt conveyer by means of a device having an elastically yielding pull on the welding base. Such a connection can be made by a rubber pull engaging the welding base and having the counter abutment on a holder.

It is preferable to fix the welding bases of rubber bands, if they are very soft.

Other and further objects, features and advantages of the invention will be pointed out hereinafter and appear in the appended forming part of the application:

FIGURE 1 is a diagrammatic representation of a vacuum packing machine,

FIGURE 2 is an enlarged side elevation of a part of the belt conveyer with a welding base secured thereon according to the invention, FIGURE 3 is a plan view on the belt conveyer of FIGURE 2, FIGURE 4 is an enlarged representation of a section through a holder with a welding base according to the line IV—IV of FIGURE 3, FIGURE 5 is a representation of another holder corresponding to that in FIGURE 4, and FIGURE 6 is a section through the representation of FIGURE 5 corresponding to the line VI—VI.

On the belt conveyer 1 of the vacuum packing machine 2 a plurality of welding bases are secured, which move together with the belt conveyer in the direction of the arrows 4. The belt conveyer 1 is guided by means of the return rollers 5. The vacuum chamber of the packing machine 2 is designated by 6.

The fastening of the welding base 3 on the belt conveyer 1 is made by means of the holders 7, the number of which corresponds to the length of the welding base 3 or the width of the vacuum chamber 6.

The fastening of the welding base 3 is made on the belt conveyer 1 by means of a simple pin 9 pushed through the last holder 8. Another embodiment is shown in dash-and-dot lines in FIGURES 5 and 6. The wire strap 10 is shaped in the manner of a hair pin, surrounds the tube 11 and penetrates through the welding base, and its extremities 12 protruding from the holder are bent off.

The rubber pull 13 cooperates with the fastening. This pull is connected on the one hand at 14 by means of a clamp, a pin, a recess or the like with the welding base 3 and on the other hand on the first holder 15. As the welding base 3 has sufficient play in the holders 7 and 15 so that the welding base 3 is movable in respect to the belt conveyer 1 in the feed direction, the rubber pull 13 is able to straighten out the welding base 3 after it has rotated around a return roller 5 for the next feeding operation. The extremity 36 of the welding base must extend sufficiently beyond the next holder 15 in order to positively prevent a slipping-out on the return roller.

FIGURE 4 shows that the welding base 3 consists of an elastic soft lower layer 16 and a stiffer and smoother upper layer 17. The bead 18 represents a positive base for the flat bag 19. The welding stamp 20 is shown in dash-and-dot lines.

The holder 7 consists of a web 21 into which a screw sleeve 22 is riveted. A screw 23 engages into this screw sleeve 22. The washer 24 prevents the screw head from slipping through the belt conveyer 1.

The two legs 25 and 26 of the holder 7 guide the welding base 3 laterally and a lug 27 extends over the surface of the welding base.

In the embodiments according to FIGURES 5 and 6 the web 21' of the U-shaped holder is held on the belt conveyer by two connecting means. The counter sunk head screw 28 engages into the sleeve 29 and the other connecting means consists of a sleeve 30, guided in the tube 11 and secured by a screw 31. The sleeve 30 together with the tube 11 and the tube socket 32 form a channel for a nitrogen filling to be fed into the bag and they represent at the same time a lateral guide for the welding base 3, which, in this case, has no bead 18.

The leg 33 carries a guide rail 34 with a slot 35, into which the flat bags to be closed can be introduced. Between the leg 33 and the guide rail 34 a riveted or welded connection may be provided.

The invention may be carried out in any different manner. It is possible to arrange the fastening device 9, 10 on the front holder seen in feeding direction and the pull 13 at the rear end. It is also possible to have a fastening about in the middle of the welding base and a corresponding arrangement of two pull bands 13 on the extremities.

With a sufficiently rigid welding base and sufficient play between the welding base and the holders it is eventually possible not to use a pulling device.

I claim:

1. In a vacuum packaging machine including pulleys, a belt conveyor passing in a closed path about said pulleys and adapted to move in a feeding direction for carrying containers to be vacuum sealed in side by side relation and a flexible welding base adapted to be mounted on said belt conveyor and to lie against said belt conveyor as it passes around said pulleys, said welding base extending longitudinally of said belt in said feeding direction, the improvement comprising fastening means for said welding base on the conveyor belt including a plurality of holders secured to said belt along the length of said welding base to position said welding base laterally of said belt conveyor, and means fixing said flexible welding base against movement longitudinally of said belt at a point on its length.

2. The device according to claim 1, in which each of said holders is of generally U-shaped configuration including a web forming the bottom of the U and two legs and guides the welding base laterally by means of its legs.

3. The device according to claim 2, wherein the web of the U-shaped holder is fixed on the belt conveyor.

4. The device according to claim 2, wherein at least one leg of the U-shaped holder has a lug which overlies and prevents the welding base lifting from the belt conveyer.

5. The device according to claim 2, wherein a leg of said U-shaped holder carries a guide rail thereon which holds the containers to be vacuum sealed on the welding base during evacuation and sealing.

6. The device according to claim 2, wherein one leg of the U-shaped holder is provided with a feed tube for introducing a filling such as nitrogen into the bag.

7. The device according to claim 2, wherein the fastening means for fastening the welding base to said belt conveyer against longitudinal movement is mounted on the last holder in feeding direction.

8. The device according to claim 2, wherein the fastening means for fastening the welding base against relative longitudinal movement with respect to the flexible belt conveyor is mounted on the leading holder in feeding direction.

9. The device according to claim 8 wherein a pin penetrates the welding base and is guided in the legs of the leading holder.

10. The device according to claim 8, wherein the extremity of the welding base that is not fastened to said belt by said leading holder is connected with the belt conveyor by means of an elastically yielding device, such as a rubber band exerting a pull on the welding base.

References Cited in the file of this patent

UNITED STATES PATENTS

| | | |
|---|---|---|
| 2,106,740 | Hepke | Feb. 1, 1938 |
| 2,727,345 | Schoppee | Dec. 20, 1955 |
| 2,976,658 | Kostur | Mar. 28, 1961 |